(12) United States Patent
Lee et al.

(10) Patent No.: US 9,738,050 B2
(45) Date of Patent: Aug. 22, 2017

(54) COMPOSITE PANEL AND JOINT CONSTRUCTION

(71) Applicant: Hyundai Translead, San Diego, CA (US)

(72) Inventors: Christian S. Lee, San Diego, CA (US); Leszek S. Jaworski, San Diego, CA (US)

(73) Assignee: HYUNDAI TRANSLEAD, San Diego, CA (US)

( * ) Notice: Subject to any disclaimer, the term of this patent is extended or adjusted under 35 U.S.C. 154(b) by 0 days.

(21) Appl. No.: 13/777,741

(22) Filed: Feb. 26, 2013

(65) Prior Publication Data

US 2013/0224419 A1 Aug. 29, 2013

Related U.S. Application Data

(60) Provisional application No. 61/603,900, filed on Feb. 27, 2012.

(51) Int. Cl.
| | | |
|---|---|---|
| *B32B 3/06* | (2006.01) | |
| *B62D 33/04* | (2006.01) | |
| *B32B 3/04* | (2006.01) | |

(52) U.S. Cl.
CPC .................. *B32B 3/06* (2013.01); *B32B 3/04* (2013.01); *B62D 33/044* (2013.01); *B62D 33/046* (2013.01); *B32B 2439/00* (2013.01); *B32B 2605/00* (2013.01); *Y10T 428/19* (2015.01); *Y10T 428/24521* (2015.01); *Y10T 428/24653* (2015.01)

(58) Field of Classification Search
CPC ........... B32B 3/06; B32B 3/04; B62D 33/046; B62D 33/044; Y10T 428/24653; Y10T 428/24521; Y10T 428/19
USPC ......................................... 428/57; 296/186.1
See application file for complete search history.

(56) References Cited

U.S. PATENT DOCUMENTS

| | | | |
|---|---|---|---|
| 5,992,117 A | 11/1999 | Schmidt | |
| 6,199,939 B1 * | 3/2001 | Ehrlich | ........................ 52/582.1 |
| 6,220,651 B1 | 4/2001 | Ehrlich | |
| 6,626,622 B2 | 9/2003 | Zubko | |
| 6,959,959 B1 | 11/2005 | Roush | |
| 6,986,546 B2 | 1/2006 | Ehrlich | |
| 7,152,912 B1 * | 12/2006 | Roush et al. | ........ B62D 29/045 |
| | | | 296/186.1 |
| 7,648,058 B2 | 1/2010 | Straza | |
| 2002/0109377 A1 * | 8/2002 | Ehrlich | ........................ 296/191 |
| 2006/0248854 A1 * | 11/2006 | Bartley-Cho et al. | ....... 52/782.1 |

(Continued)

OTHER PUBLICATIONS

Canadian Office Action received for corresponding Canadian Application No. 2,807,710.

(Continued)

*Primary Examiner* — Aaron Austin
*Assistant Examiner* — Jasper Saberi
(74) *Attorney, Agent, or Firm* — Procopio, Cory, Hargreaves & Savitch LLP

(57) ABSTRACT

A composite panel comprises a first outer layer, a second outer layer, a filler layer, and a joint section of the composite panel. The filler layer is positioned between a portion of the respective first and second outer layers. The first and second outer layers are positioned adjacent one another without an intervening filler layer.

8 Claims, 11 Drawing Sheets

(56) References Cited

U.S. PATENT DOCUMENTS

2009/0123709 A1  5/2009  Straza
2011/0204678 A1* 8/2011  Katz et al. ........... B62D 33/046
                                                        296/186.1

OTHER PUBLICATIONS

Canadian Office Action dated Oct. 20, 2014 from co-pending application CA 2,807,710, 4 pages.

* cited by examiner

COMPOSITE PANEL AND JOINT CONSTRUCTION

FIELD

The present disclosure relates to composite panels and to assemblies joining together one or more composite panels.

BACKGROUND

Various composite panel constructions are known. In a typical composite panel, a sandwich construction is used that includes at least three layers. The three layers include first and second faces and sandwiched between them a middle layer also called a filler layer. Various filler layer materials or assemblies also are known. Examples of known filler layers include resins, plastics, honeycombs of various metals including plastics and metals, or non-honeycomb formed metals or plastics.

Various joint constructions are used to link together composite panels to form a longer wall comprised of plural composite panels. Some such constructions for joining together composite panels utilize connectors that are fastened to adjoining panels, serving to connect the adjoining panels together serially. Among the deficiencies of some known joint constructions are relatively high cost, and impairment of the filler layers leading to impairment of the structural integrity of the composite panel and the serially linked structure.

Among the uses of composite panels are for sidewalls or roofs of truck trailers and cargo containers. In such trailers or cargo containers multiple composite panels are joined in series, side-to-side to form longer constructions. In such constructions, the structural viability of the joints are important given the potential for buckling of the elongated walls.

Accordingly there is a need for composite wall panel joints that join together one or more composite panels while retaining structural strength of the joined panels. Likewise there is a need for an improved composite panel joint suitable for use in truck trailers and cargo containers.

SUMMARY

The present disclosure, in its many embodiments, alleviates to a great extent the disadvantages of known composite panel joint constructions by providing an elongated composite panel joint section or region on a composite panel in which the filler layer is not present and the panel faces are joined in proximity with one another. In this panel construction, the panel in lateral cross section generally has three regions, a region with a filler layer of any desired material or construction, a transition region where at least one of the outer layers is shaped to move in closer proximity to the other of the outer layers, and in which the filler layer is optionally present, and a joint region in which at least a portion of the outer layers are adjacent to one another, without a filler layer or having an adhesive interposed between the adjacent outer layers.

In one embodiment, a joining assembly is provided in which adjacent panels having the joint section are affixed relative to one another via the joining assembly.

Accordingly, it is seen that a composite panel joint construction is provided that provides for the structural integrity of individual panels while providing a joining section. These and other features and advantages will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying figures, in which.

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

This disclosure refers to and incorporates herein the attached figures and materials.

Figure 1:
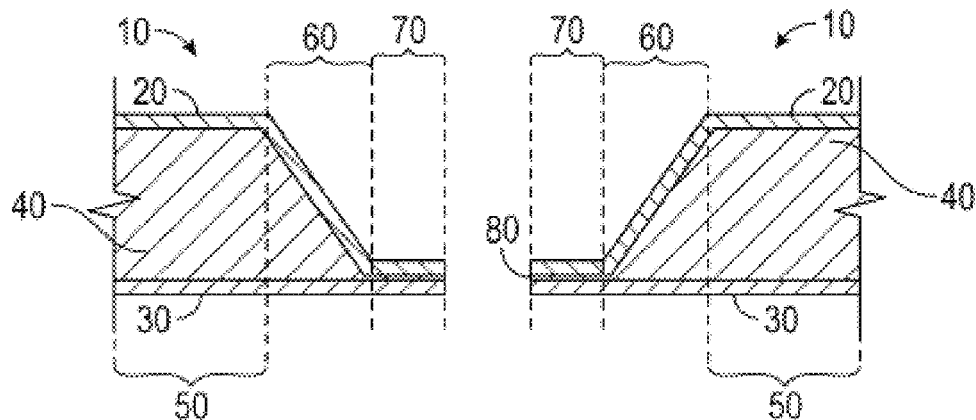
FIG. 1 is a cross-sectional view of a portion of a composite panel of the present invention.

Referring to FIG. 1, an example of a composite panel 10 of the present invention is provided. In the illustrated composite panel, three layers are provided. Two outer layers 20, 30 are provided, which also can be called face or skin layers. It should be appreciated that in some applications, the respective outer layers 20 and 30 may be top and bottom layers, or also insider and outside layers. For example in a truck trailer, it may be desired that the flatter layer 30 be positioned on an inside surface of the trailer and the other layer 20 be on the outside surface of the trailer. In the composite panel 60, the inner layer 40, also called the filler layer 40, is positioned between a portion of the respective outer layers 20, 30.

In the illustrated embodiment, the composite panel has three sections. Section 50 illustrates all or a portion of the panel in which the filler layer 40 is positioned between the inner and outer layers. Transitional section 60 is a region in which one or both of the outer layers 20, 30 are shaped, such as angled, in order to bring them into relatively closer proximity with one another. In the illustrated embodiment outer layer 20 is angled, while layer 30 is not, so as to maintain a flat profile. In the transitional region 60, the filler layer 40 is optionally included. In one embodiment, there is no filler layer in the transitional region. In another embodiment, the filler layer extends into only a portion of the transitional region 60. In a further embodiment, the filler layer extends the entire or substantially the entire portion of the transitional region.

Section 70 is a joint section, and will also be referred to as joint section 70. Joint section 70 generally does not have any of the filler layer 40. In joint section 70, the two outer layers 20, 30 are positioned next to one another. In one embodiment, they optionally are joined by a layer of adhesive 80. In the illustrated embodiment, outer layer 20 is angled (or curved) to be positioned in to proximity with the other outer layer 30 in the joint section 70. As already discussed other configurations may be used so long as in the joint section 70, the two layers 20, 30 are positioned next to one another. It is preferred that the outer layers 20,30 are generally linear in cross-section in the joint section 70, however it should be understood that any cross-sectional profile may be selected whereby the two layers 20, 30 are next to one another and amenable to being joined to adjacent composite plates.

Figure 2:
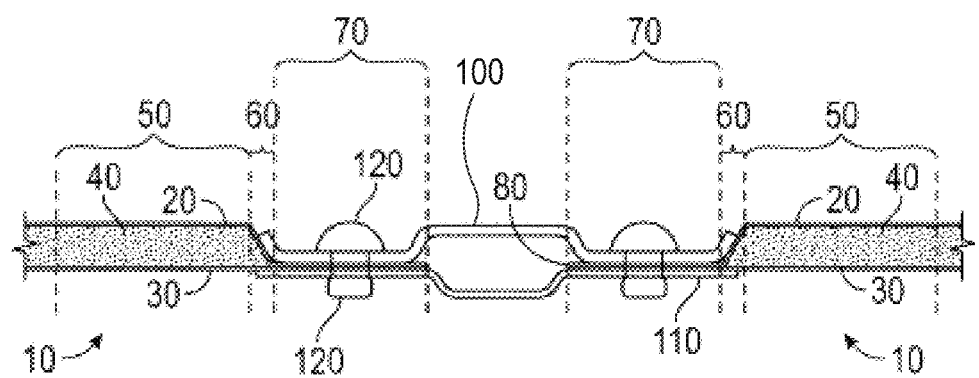
FIG. 2 is a cross-sectional view of a portion of a composite panel and joint assembly of the present invention.
Figure 3:
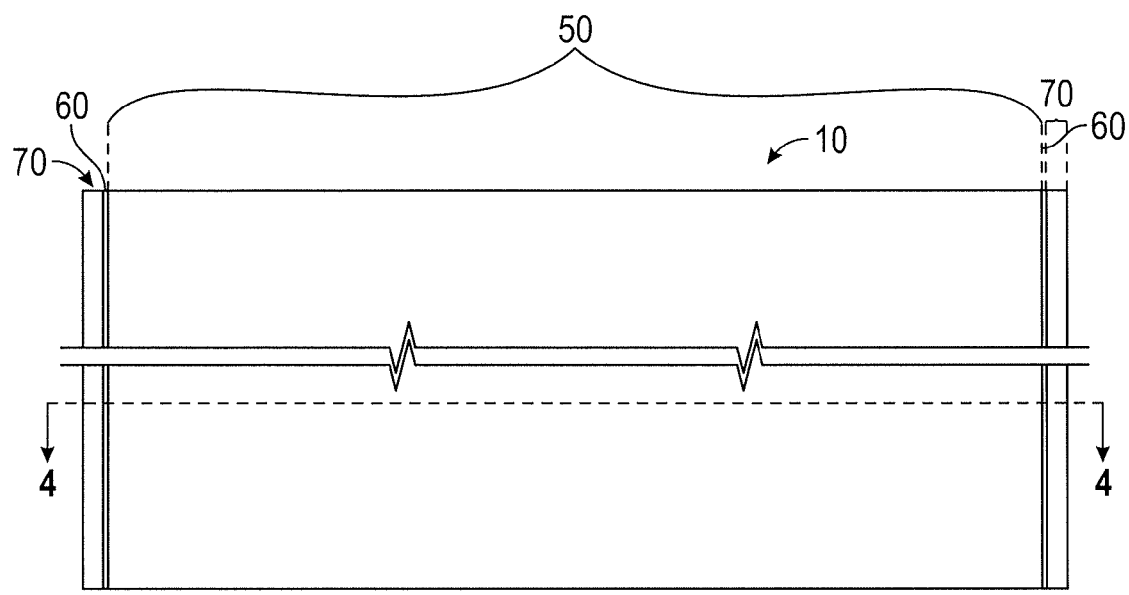
FIG. 3 is plan view of a panel in accordance with the present invention.
Figure 4:
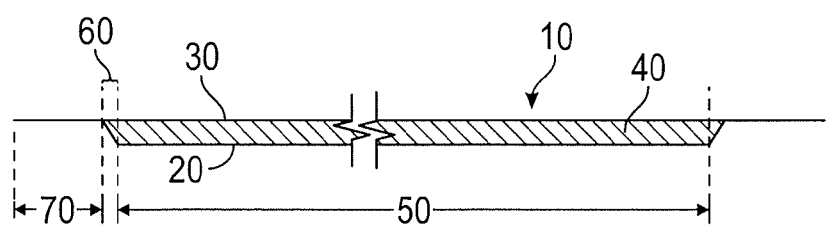
FIG. 4 is a cross-sectional view of a panel in accordance with the present invention, taken along line 4-4 as illustrated in FIG. 3.
Figure 5:
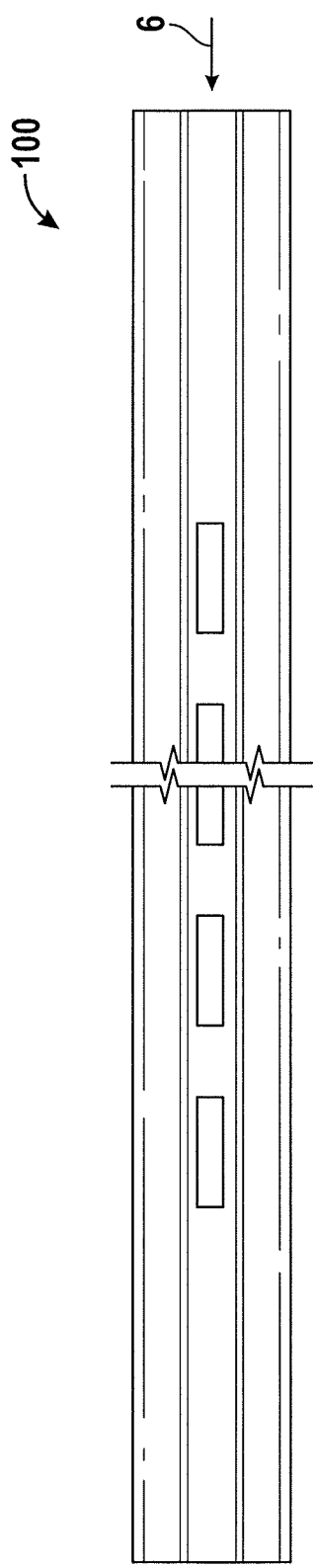
FIG. 5 is a plan view of a joining member in accordance with the present invention.
Figure 6:
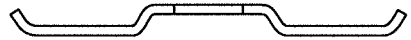
FIG. 6 is an end view of a joining member in in accordance with the present invention, as viewed from direction 6 in FIG. 5.
Figure 7:
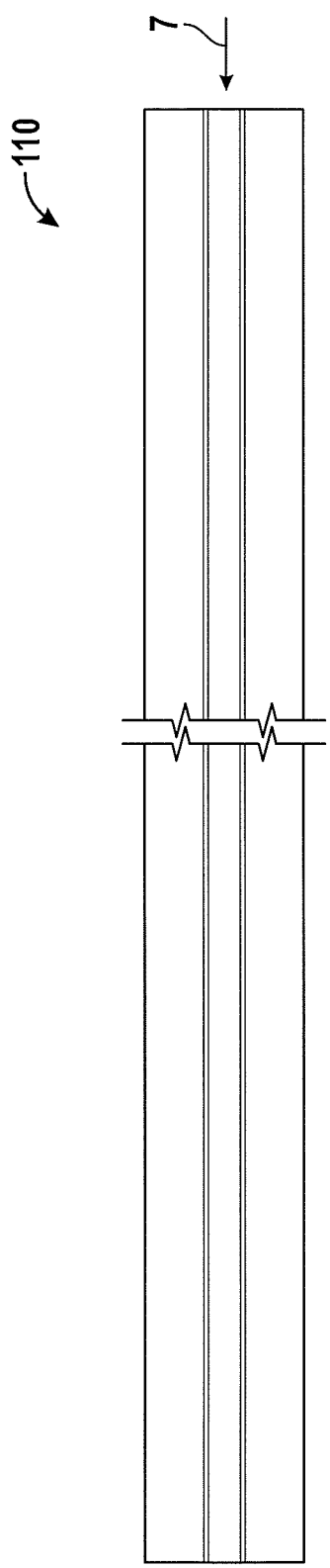
FIG. 7 is a plan view of a joining member in accordance with the present invention.
Figure 8:
FIG. 8 is an end view of a joining member in in accordance with the present invention, as viewed from direction 7 in FIG. 5.
Figure 9:
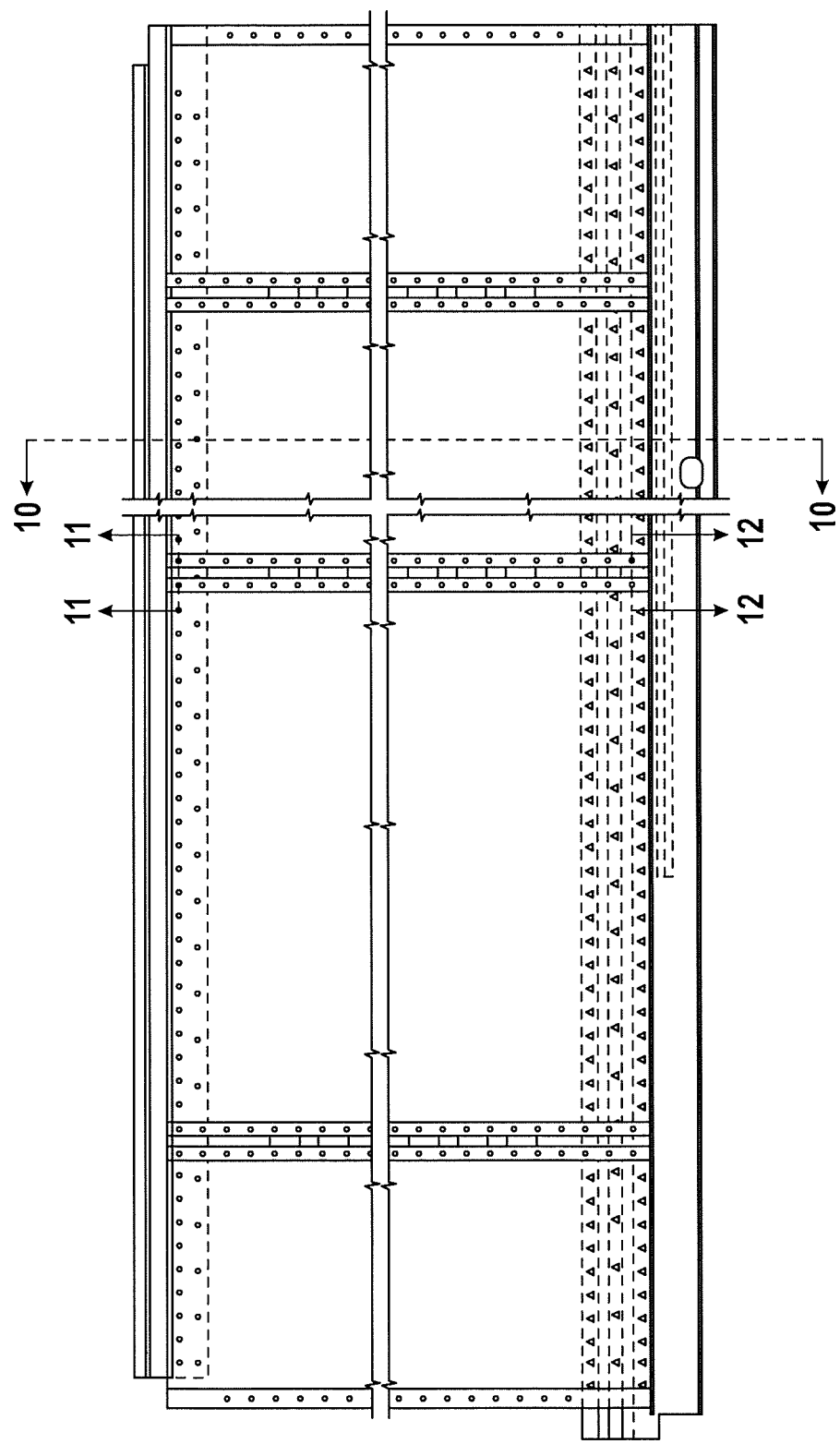
FIG. 9 is a plan view of a cargo container in accordance with the present invention.
Figure 10:
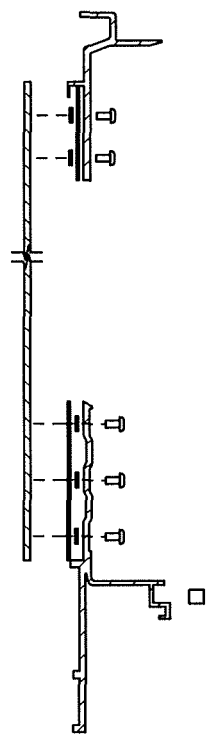
FIG. 10 is a cross-sectional view of a cargo container taken along line 10-10 in FIG. 9.
Figure 11:
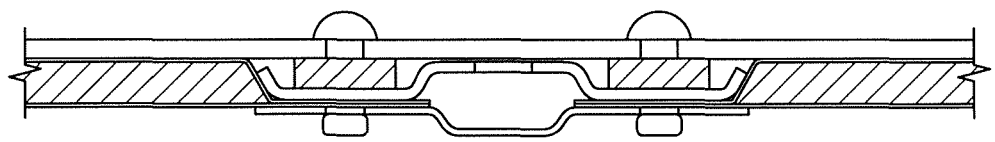
FIG. 11 is a joint construction in accordance with the present invention.
Figure 12:
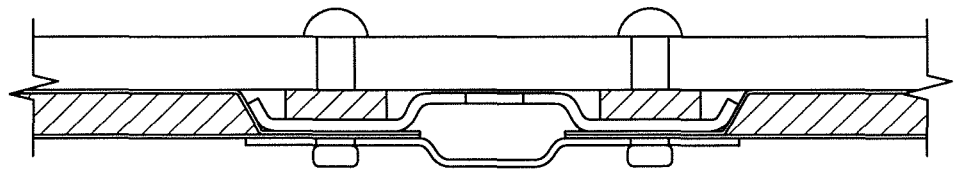
FIG. 12 is a joint construction in accordance with the present invention.
Figure 13:
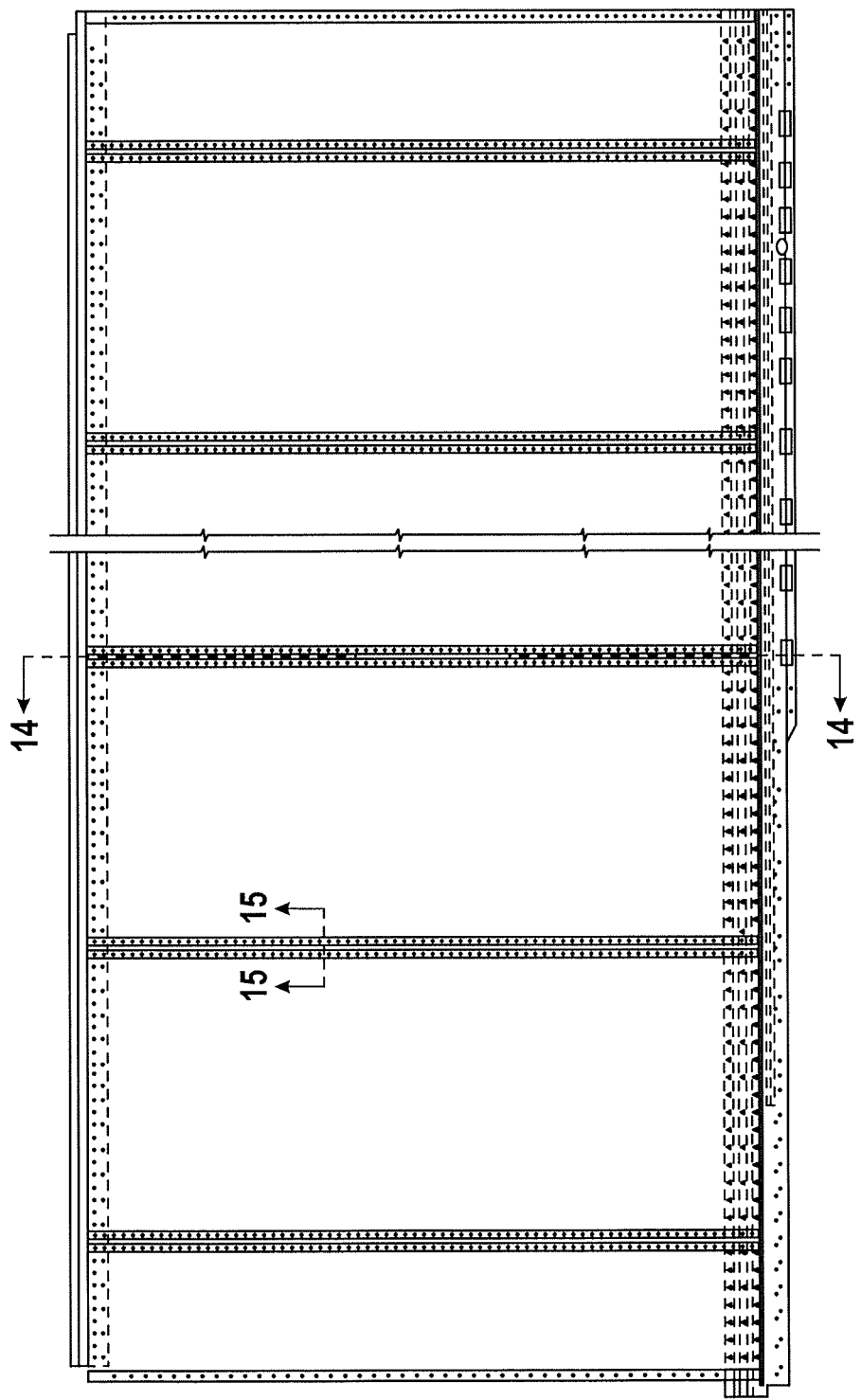
FIG. 13 is a plan view of a cargo container in accordance with the present invention.
Figure 14:
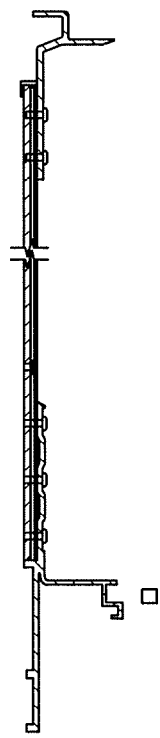
FIG. 14 is a cross sectional view of a cargo container wall in accordance with the present invention, taken a long line 14-14 in FIG. 13.
Figure 15:
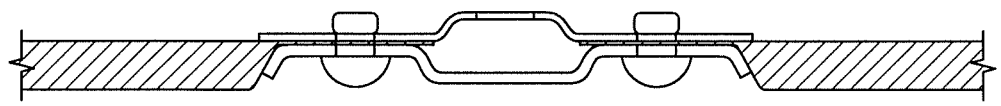
FIG. 15 is a cross-sectional view of a joint construction in accordance with the present invention, taken along line 15-15 in FIG. 13
Figure 16:
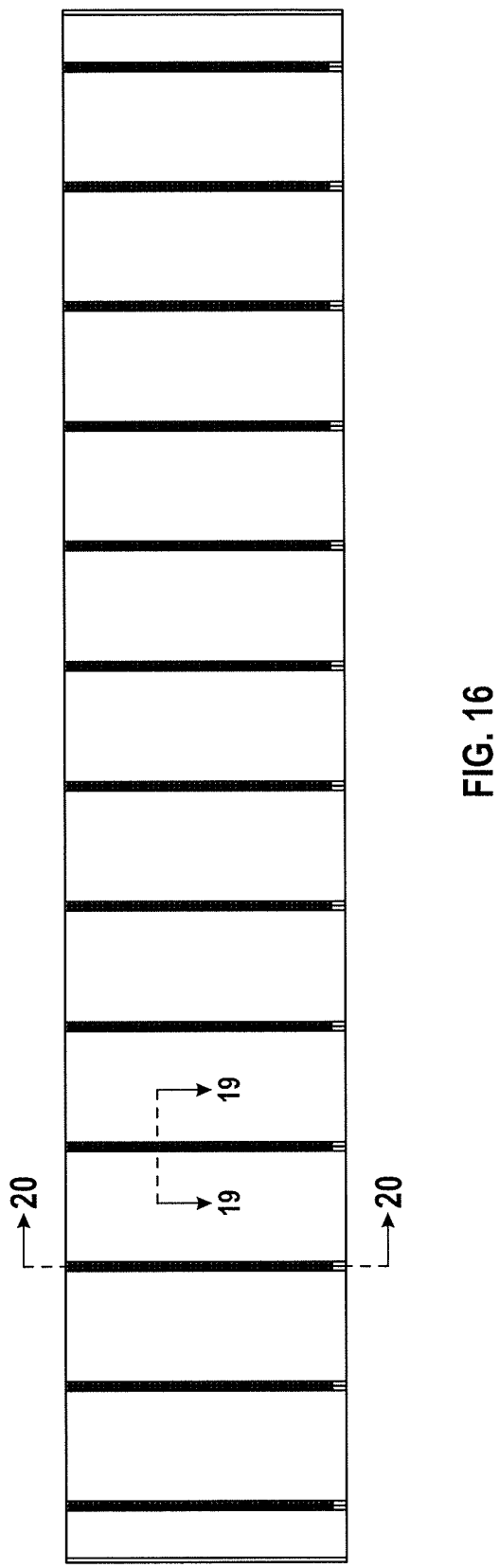
FIG. 16 is a plan view of a cargo container in accordance with the present invention.
Figure 17:
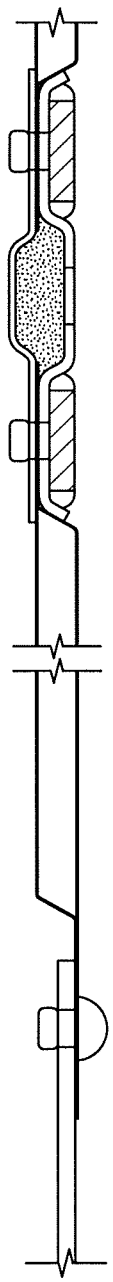
FIG. 17 is a cross-sectional view of a joint construction in accordance with the present invention.
Figure 18:
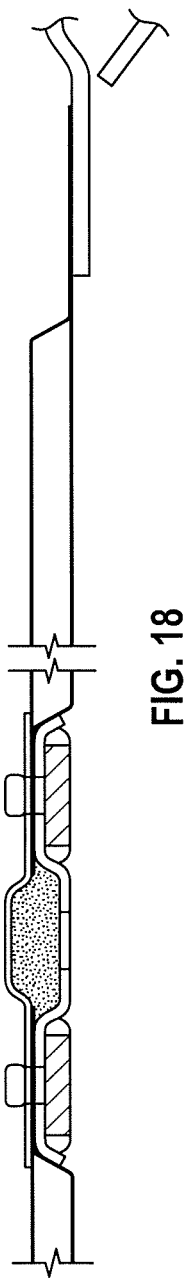
FIG. 18 is a cross-sectional view of a joint construction in accordance with the present invention.
Figure 19:
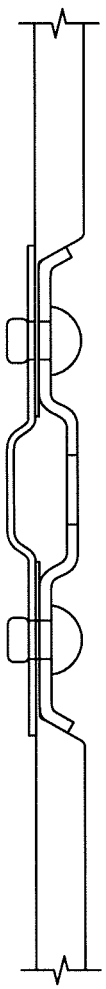
FIG. 19 is a cross-sectional view of a joint construction in accordance with the present invention, taken along line 19-19 of FIG. 16.
Figure 20:
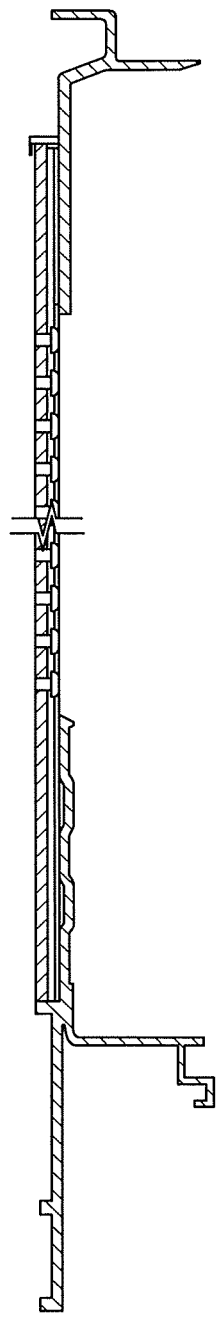
FIG. 20 is a cross-sectional view of a cargo container in accordance with the present invention, taken along line 20-20 of FIG. 16.
Figure 21:
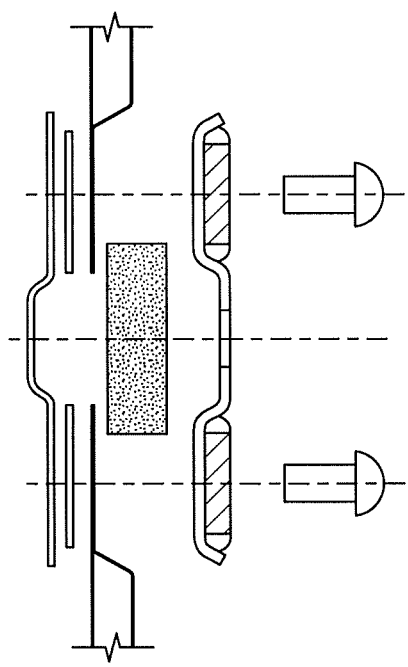
FIG. 21 is a cross-sectional exploded view of a joint construction in accordance with the present invention.

As illustrated in FIG. 2 and other figures, optionally one or more joining members 100, 110 maybe be utilized to join together adjacent composite plates 10. In one example, a truck trailer or cargo container is provided in which several elongated composite plates 10 are joined to one another serially using elongated joining members (which optionally may be posts) 100, 110. In the embodiment illustrated in FIG. 2, the joining assembly includes first and second joining members 100, 110, and connectors 120 (such as rivets or bolts) extending therethrough. It should be appreciated that a single connector also may be used, or that one is a cover for the purpose of maintaining a smooth surface (such as joining member 110). In the illustrated embodiment, the connectors extend through the outer layers 20 and 30 and the joining members 100, 110 in the joint region 70 of the panels 10. In order to enhance the structural integrity of the panels 20 in larger panel constructions, such as cargo containers or truck trailers, the filler layer 40 does not extend into the joint region and the connectors 120 are positioned in the joint region 70. However, it should be appreciated that the connectors 120 may be used in any region that provides a sufficient connection to position adjacent panels 10 in a substantially fixed relation to one another.

Thus, it is seen that a composite panel and composite panel joint construction are provided. It should be understood that any of the foregoing configurations and specialized components or may be interchangeably used with any of the apparatus or systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the disclosure.

What is claimed is:

1. A composite panel and joint assembly forming a wall or roof, the assembly comprising:
a plurality of composite panels spaced a distance apart from one another, each composite panel having a middle section, a transitional section, and a joint section, wherein each composite panel includes:
a first outer layer forming an outer surface of the wall or roof,
wherein the transitional section of the first outer layer is angled from the middle section to the joint section;
a second outer layer forming an inner surface of the wall or roof, wherein the transitional section of the second outer layer is flat;
a filler layer positioned between the first and second outer layers in the middle section and the transitional section;
a first joining member and a second joining member each configured to couple adjacent composite panels that are spaced apart by extending out to connect the joint sections of the adjacent composite panels, the first joining member being positioned adjacent to the first outer layer on the outer surface of the wall or roof, the first joining member having a uniform thickness and an angled portion matching an angle of the transitional section of the first outer layer;
wherein the first and second joining members are positioned opposite one another,
wherein the first joining member has a first bulging portion having a first bulge width and the second joining member has a second bulging portion having a second bulge width smaller than the first bulge width and extending between the composite panels, the first bulging portion and the second bulging portion directly opposing one another; and
a plurality of connectors, each connector extending through the first joining member, the second joining member, and the joint section of one of the adjacent composite panels.

2. The composite panel and joint assembly of claim 1, wherein the joint sections of the adjacent composite panels are positioned between the first and second joining members.

3. The composite panel and joint assembly of claim 1, wherein the plurality of connectors extend through the first joining member, the joint section of the first outer layer, the joint section of the second outer layer, and the second joining member, to secure the adjacent composite panels substantially fixed in relation with one another.

4. The composite panel and joint assembly of claim 1, wherein the joint sections of the first and second outer layers are coupled to each other with a layer of adhesive.

5. The composite panel and joint assembly of claim 1, the first joining member and the second joining member are configured to couple the adjacent composite panels at the joint section and at the transitional section.

6. A composite panel and joint assembly, comprising:
a plurality of composite panels spaced a distance apart from one another, wherein each composite panel includes:
  a first outer layer having a first middle section, a first transitional section, and a first joint section, wherein the first transitional section is angled;
  a second outer layer having a second middle section, a second transitional section, and a second joint section, wherein the second middle section, the second transitional section, and the second joint section are all flat;
  a filler layer positioned between the first and second middle sections and the first and second transitional sections; and
a first joining member and a second joining member each configured to couple adjacent composite panels that are spaced the distance apart by extending out to connect the first and second joint sections of the adjacent composite panels, the first joining member having a uniform thickness and being positioned on an outside of the composite panel and joint assembly, the first joining member further having an angled portion matching an angle of the first transitional section,
wherein the first and second joining members are positioned opposite one another,
wherein the first joining member has a first bulging portion having a bulge width approximately equal to the distance between the plurality of panels, and
wherein the second joining member has a second bulging portion having a second bulge width smaller than the first bulge width extending between the composite panels, the first and second bulging portions being disposed directly opposing one another;
a plurality of connectors, each connector extending through the first joining member, the second joining member, and the first and second joint sections of one of the adjacent composite panels; and
wherein the joint sections of the first and second outer layers are coupled to each other without a filler layer.

7. The composite panel and joint assembly of claim 6, wherein the first and second joint sections are coupled to each other with a layer of adhesive.

8. A composite joint assembly for joining panels comprising:
a plurality of panels spaced apart by a distance, each panel of the plurality of panels having
  an outer layer forming an exterior of the panel,
  an inner layer opposite the outer layer forming an interior of the panel, and
  a transition section disposed between a middle section and a joint section of each panel, wherein the outer layer is angled in the transition section such that the outer layer is adjacent to the inner layer in the joint section and joined to the inner layer using an adhesive, and
  a filler layer disposed between the inner layer and the outer layer in the middle section and the transition section of the panel;
a first joining member coupled to the outer layer of the joint section of two adjacent panels of the plurality of panels, the first joining member having
  a uniform thickness,
  a pair of angled portions matching an angle of the transition sections of the outer layers of the two adjacent panels, and
  a first bulge having a first bulge width approximately equal to the distance between the two adjacent panels;
a second joining member adjacent to the inner layer of the joint section of the two adjacent panels, the second joining member having a second bulge having a second bulge width smaller than the first bulge width; and
a plurality of connectors, each connector of the plurality of connectors extending through the first joining member, the joint section of one of the two adjacent panels, and the second joining member.

* * * * *